United States Patent Office 2,758,105
Patented Aug. 7, 1956

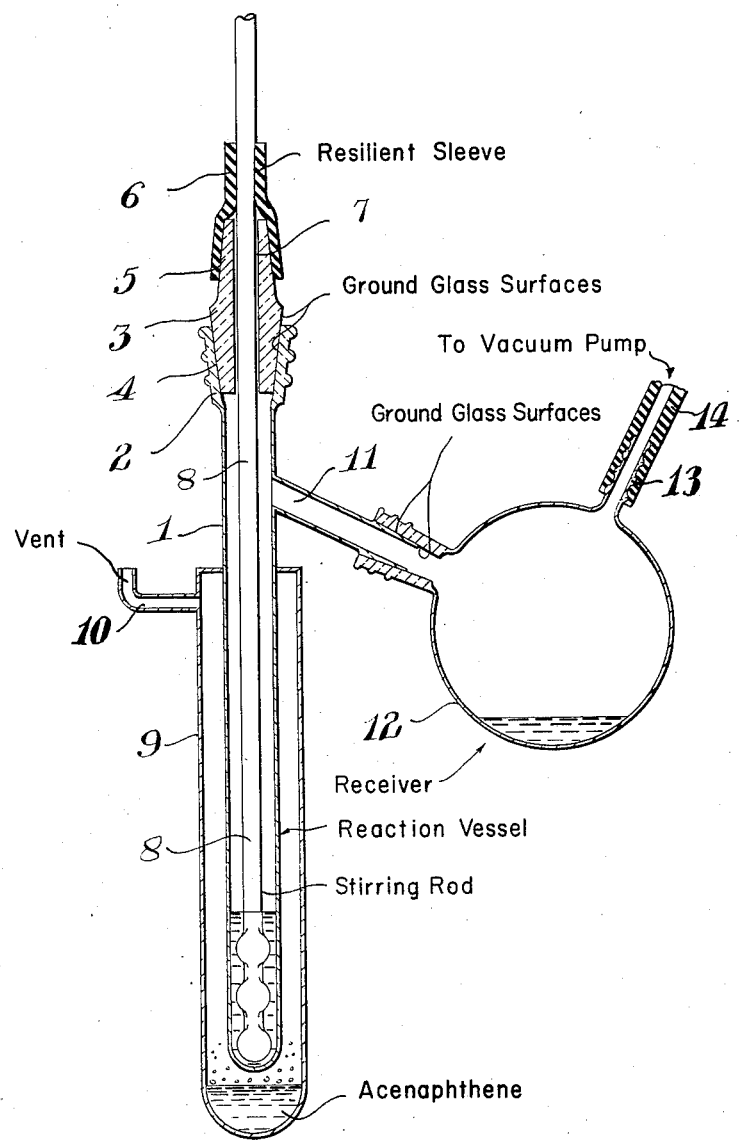

2,758,105

PREPARATION OF POLYALKYLENE TEREPHTHALATES

Francis Peter Alles, Westfield, and William Russell Saner, Plainfield, N. J., assignors to E. I. du Pont de Nemours & Company, Wilmington, Del., a corporation of Delaware Application March 24, 1953, Serial No. 344,412

7 Claims. (Cl. 260—75)

This invention is concerned with a method of controlling the molecular weight of polymeric esters of glycols and terephthalic acid. More particularly, it relates to such a method wherein an alkyl β-naphthoate is used. Still more particularly it relates to a method of controlling the molecular weight of polyethylene terephthalates with calculated amounts of methyl-β-naphthoate.

Various methods have been proposed to control the degree of polymerization of polymeric linear esters of glycols and terephthalic acid or an ester-forming derivative of terephthalic acid, including the use of monofunctional acids, ester-forming derivatives of such acids and monofunctional alcohols. However, the proposed acids and alcohols have some economic disadvantages and do not always make the resulting polyester suitable for use in the form of strong coherent sheets of film of uniform quality.

It has been found that the alkyl β-naphthoates and 2-carboalkoxy-3-hydroxy naphthalenes wherein the alkyl groups contain 1 to 4 carbon atoms, are unique and when admixed with a glycol and terephthalic acid or an ester-forming derivative thereof during a polymeric esterification reaction effectively control the molecular weight and viscosity of the resulting highly polymeric polyalkylene terephthalate. This control enables one to cast continuous films, and films which after orientation by stretching, result in films and fibers which have good strength and are uniform in character and are suitable for a variety of special uses, e. g., films made by this process are especially useful as photographic film base. The uniformity of properties for this purpose is of considerable importance because of the rigid specifications and the costly manufacturing operations involved in the manufacture of such products. Small variations in molecular weight and viscosity of cast polyester films and fibers in continuous operations present production difficulties, such as poor gauge control, poor uniformity of dyeing and difficulties in metering.

The process may be carried out advantageously in two stages by first admixing in a suitable polymerization reaction vessel, the terephthalic acid or an ester-forming derivative thereof, with the glycol in a 1:2 mol ratio and heating the admixture to a temperature of 150° C. to 265° C. for a period sufficient to yield a large amount of monomeric diester of the glycol with terephthalic acid, e. g., from 15 to 120 minutes. The lower alkyl β-naphthoate and 2-carboalkoxy 3-hydroxy naphthalenes are then admixed with the monomeric diester and the mixture heated under a reduced pressure of .001 to 7 mm. of mercury with continuous agitation, for a period of 15 to 600 minutes. The alkyl and alkoxy radicals will contain 1 to 4 carbon atoms, e. g., methyl, ethyl, propyl, and butyl; methoxy ethoxy, propoxy and butoxy.

The amount of alkyl β-naphthoate or 2-carboalkoxy-3-hydroxy naphthalenes used will depend upon the intrinsic viscosity or molecular weight desired for the polyester. This molecular weight will vary from 23,300 to 33,500. A practical range of methyl-β-naphthoate is 1.61% to 1.12% by weight of the final polyester. If a higher alkyl β-naphthoate or a 2-carboalkoxy-3-hydroxy naphthalene is used, the amount is increased in direct proportion to the increase in molecular weight of such ester over the methyl β-naphthoate. The amount of unsubstituted naphthoyl radical in said alkyl-β-naphthoate will vary in an amount from 1.34% to 0.93% by weight, respectively, of the molecular weight of the polyalkylene terephthalate, exclusive of the weight of the naphthoyl radical.

In this application "intrinsic viscosity" is defined as $$\frac{4(Nr^{\frac{1}{2}}-1)}{C}$$

wherein Nr is the viscosity of a dilute solution of the polyester in a mixture of phenol and trichlorphenol divided by the viscosity of the phenol/trichlorphenol solvent in the same units and at the same temperature and C is the concentration in grams of polyester per 100 ml. of solution. Intrinsic viscosity, as is well-known, is a measure of molecular weight.

A suitable reaction vessel for making small quantities of polymer is shown in the accompanying drawing. The single figure of this drawing is shown in a cross-sectional view. Referring to the drawing a heat-resisting glass cylindrical vessel 1 is provided at its upper end with a ground glass section 2 which is adapted to receive a glass closure plug 3 having a cooperating ground glass surface 4 and a tapered upper end 5 adapted to receive a flexible (e. g., rubber) sleeve 6. The plug has an elongated cylindrical opening 7 adapted to receive a stirring rod 8 extending to near the bottom end of tube 1. Sleeve 6 also serves as a seal for stirring rod 8. The tube is surrounded with a cylindrical jacket 9 covering the major part of it. This jacket is fused to the tube at its upper end and is provided with a vent tube 10 near said end. A liquid or solid material of high vapor pressure, e. g., acenaphthene is charged in the jacket as a temperature regulating fluid. A lateral tube 11 extends from near the upper end of vessel 1 and establishes communication with a receiver 12. The end of tube 11 is tapered and ground to tightly fit in a cooperating tapered extension of the walls of heat-resisting glass receiver 12. The latter is provided with a lateral pipe 13 through which vapor is exhausted through a tube 14 connecting to a suitable vacuum pump (not shown). Various other conventional polymerization apparatus can obviously be used in place of that just described, in practicing the invention.

The invention will be further illustrated but is not intended to be limited by the following examples.

*Example 1*

Dimethyl terephthalate and ethylene glycol (1:2 mole ratio) were heated together in the presence of litharge (0.01% based on the weight of dimethyl terephthalate) at a temperature of 160° to 235° C., to give a monomer having a polymer equivalent of 82.2%, of the following composition:

where n is 1 to 6. Six grams of this monomer and 0.070 gram of methyl β-naphthoate (1.42% based on the estimated polymer yield) were placed in the reaction vessel of the apparatus shown in the attached drawing. The vessel was heated to provide a vapor bath of acenaphthene (B. P. 277° to 278° C.). After the monomer had melted, the stirrer was started and the receiver was connected to a vacuum pump. The pressure was reduced gradually to approximately 0.05 millimeters of mercury and the reaction was continued at such pressure for four hours. The ethylene glycol evolved during the reaction was collected in the receiver. At the end of the reaction, the polymer was permitted to drain for 10 to 15 minutes. The tube was plunged in an ice bath to chill the polymer rapidly. A chip of the polymer (polyethylene terephthalate) was removed from the tube and its intrinsic viscosity in a mixture of phenol and trichlorophenol (100:70 parts by weight), was found to be 0.48.

A second sample of the monomer, containing the same concentration of methyl β-naphthoate, was polymerized at a pressure of 0.05 mm. for six hours. The intrinsic viscosity of the resulting polyethylene terephthalate was close to the preceding sample, being 0.53.

Control samples of the monomer without methyl β-naphthoate, when polymerized under the foregoing conditions for four hours and 5½ hours, at a pressure of 0.05 mm., had intrinsic viscosities of 0.54 and 0.74, respectively.

*Example II*

Dimethyl terephthalate and ethylene glycol (1:2 mole ratio) were heated in the presence of 0.121% of zinc salicylate $(Zn(C_7H_5O_3)_2 \cdot 3H_2O)$ and 1.42% of methyl β-naphthoate (based on weight of theoretical polymer yield) at a temperature of 194° C. to 263° C. until the theoretical yield of methanol had been obtained. The temperature was then increased to 277° C. to 278° C. and the pressure was gradually reduced to 0.3 mm. for one hour. The ethylene glycol evolved during the reaction was collected in the receiver. At the end of the reaction, the polymer was allowed to drain and was then plunged in an ice bath. A chip of the polymer (polyethylene terephthalate) was removed from the tube and its intrinsic viscosity, determined as in Example I, was 0.47.

A second sample of monomer prepared from the same proportions of the foregoing reactants and catalyst was permitted to polymerize at 0.3 mm. for three hours and the resulting polyethylene terephthalate had an intrinsic viscosity of 0.50.

Polyethylene terephthalate prepared under identical conditions but without methyl β-naphthoate, after one and three hours of polymerization, had respective intrinsic viscosities of 0.50 and 0.66.

*Example III*

Dimethyl terephthalate and ethylene glycol (1:2 mole ratio) were heated in the presence of 0.068% of zinc acetate $(Zn(C_2H_3O_2)_2 \cdot 2H_2O)$ and 1.42% of the methyl ester of β-naphthoic acid (based on the theoretical polymer yield) at a temperature of 160°–245° C. until the theoretical yield of methanol had been obtained. The temperature was then increased to 277°–278° C. and the pressure was gradually reduced to 0.3 mm. of mercury. The reaction was continued at 0.3 mm. for three hours. At the end of the reaction, the polymer was allowed to drain and was chilled in an ice bath. A chip of the polymer (polyethylene terephthalate) was removed from the tube and its intrinsic viscosity, determined as in Example I, was found to be 0.47.

A sample of polyethylene terephthalate prepared under identical conditions without methyl β-naphthoate had an intrinsic viscosity of 0.70.

*Example IV*

Dimethyl terephthalate and ethylene glycol (1:3 mole ratio) were heated together in the presence of litharge (0.01% based on the weight of dimethyl terephthalate) at a temperature of 160° to 235° C., to give a product having a polymer equivalent of 81.3%, of the following composition:

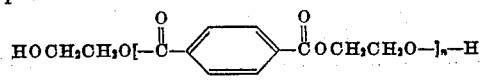

where $n=1$ to 6. Six-grams samples of this monomer were placed in each of three polymerization tubes of the type shown in the drawing. Four hundredths gram of methyl β-naphthoate (0.82% based on polymer yield) was added to one tube and 0.07 gram (1.43%, based on polymer yield) was added to the second tube; no terminator was added to the third tube. All three samples were heated to 277° to 278° C. The pressure was then reduced gradually to 0.30 mm. of mercury and the polymerization continued, with agitation, for six hours in the case of the samples containing methyl β-naphthoate, and for three hours in the case of the control. The intrinsic viscosities of the polyethylene terephthalate made from the three samples were as follows:

| Percent Methyl β-naphthoate | Hours at 0.3 mm. of Hg | Actual Intrinsic Viscosity | Calculated Intrinsic Viscosity |
|---|---|---|---|
| 0 | 3 | 0.70 | |
| 0.82 | 6 | 0.62 | 0.78 |
| 1.42 | 6 | 0.51 | 0.50 |

*Example V*

Six grams of the monomer of Example I were placed in each of three test tubes. 2.5% and 1.42% (based on polymer yield) of methyl β-naphthoate was added to each of two tubes while no terminator was added to the third tube. All three samples were heated to 277° to 278° C. The pressure was then reduced gradually to 0.30 mm. of mercury and the polymerization continued, with agitation, for four hours. The intrinsic viscosities of the three samples were as follows:

| Percent Methyl β-naphthoate | Hours at 0.3 mm. of Hg | Actual Intrinsic Viscosity | Calculated Intrinsic Viscosity |
|---|---|---|---|
| 0 | 4 | 0.54 | |
| 1.42 | 4 | 0.48 | 0.50 |
| 2.5 | 4 | 0.33 | 0.30 |

*Example VI*

Six grams of the monomer of Example IV and 0.076 gram of 2-carbomethoxy-3-hydroxy naphthalene were heated together to 277° C.–278° C. The pressure was reduced gradually to 0.4 mm. of mercury and the polymerization continued, with agitation, for eight hours. The intrinsic viscosity of the polymer was 0.48. The amount of terminator was equivalent to 1.42% of methyl β-naphthoate, taking into account the difference in molecular weight. The intrinsic viscosity of 0.48 was close to the expected value of 0.50. The 2-carboethoxy-, 2-carbopropoxy- and 2-carbo-n-butoxy-3-hydroxy naphthalenes when substituted in similar amounts will give similar results.

*Example VII*

Dimethyl terephthalate and ethylene glycol (1:2 mol ratio) were heated together in the presence of zinc acetate dihydrate (0.068% based on the weight of dimethyl terephthalate) at a temperature of 160° to 240° C., to give a product of the composition shown in Example I of the specification. Eight (8) grams of this monomer and 0.109 gram of n-butyl β-naphthoate, calculated to give an intrinsic viscosity of 0.50, were placed in a polymer tube of the type shown in the drawing. The tube was equipped with a stirrer and placed in a vapor bath of acenaphthene (boiling point 277° to 278° C.). After the monomer had melted, the stirrer was started and the polymer tube was connected to a vacuum pump. The pressure was reduced gradually to 0.2 mm. of mercury and the reaction was continued for three hours. The ethylene glycol evolved during the reaction was collected in the receiver. At the end of the reaction the polymer was permitted to drain for 10 to 15 minutes. The tube was plunged in an ice bath to chill the polymer rapidly. A chip of the polymer was turned out of the tube and its intrinsic viscosity in a mixture of phenol and 2,4,6-trichlorophenol (100:70 parts by weight) was 0.505. A sample prepared under identical conditions without n-butyl β-naphthoate was found to have an intrinsic viscosity of 0.66, after three hours of polymerization.

When methyl benzoate is substituted for the methyl β-naphthoate or 2-carbomethoxy-3-hydroxy naphthalene it is difficult to control the intrinsic viscosity at any predetermined value because of the volatility of methyl benzoate. This is exemplified in the following procedure:

Dimethyl terephthalate and ethylene glycol (1:2 mole ratio) were heated in the presence of 0.121% of zinc salicylate ($Zn(C_7H_5O_3)_2.3H_2O$) and 1.04% methyl benzoate (equivalent to 1.42% of methyl β-naphthoate and designed to give an intrinsic viscosity of 0.50) at a temperature of 160° C. to 244° C., until the theoretical yield of methanol had been obtained. The temperature was then increased to 277° to 278° C. and the pressure was gradually reduced to 0.3 mm. of mercury. The reaction was continued for three hours with stirring. The intrinsic viscosity of the polymer was determined to be 0.62 compared to 0.66 for a control prepared under identical conditions in the absence of methyl benzoate. In this instance the methyl benzoate was practically ineffective in controlling the intrinsic viscosity.

In place of the ethylene glycol described in the foregoing examples there may be substituted other polymethylene glycols having 2 to 10 methylene groups, with similar results. Suitable other glycols include tri-, tetra-, penta-, hexa-, hepta-, nona- and penta-methylene glycols. Mixtures of two or more of these glycols, or of one or more of them with ethylene glycol, can be used if desired.

Similarly, in place of the dimethyl terephthalate one may substitute diethyl terephthalate with similar results. The latter compound can be used with ethylene glycol or the glycols and mixtures of glycols described in the previous paragraph.

The invention obviously is not limited to the specific catalyst set forth in the previous examples. Other suitable catalysts include lithium, sodium, potassium calcium, beryllium, magnesium, zinc, cadmium, aluminum, chromium, molybdenum, manganese, iron, cobalt, nickel, copper, silver, mercury, tin, lead, bismuth, antimony platinum and palladium. Suitable proportions are from 0.025% to 0.1% of the weight of the ester of the dicarboxylic acid used. The ester interchange catalysts may be added as such in the form of powder, chips, shavings, ribbon, wire or in any other convenient form. The alkali metals, the alkaline earth metals, or magnesium are conveniently used in the form of alcoholates, formed by dissolving them in the glycol to be used or in a monohydric alcohol such as methyl or ethyl alcohol. The alkali metals may also be used in the form of their carbonates or other alkaline reacting salts, for example, borates. Magnesium may be used in the form of its oxide.

The polymethylene terephthalates of this invention have the advantage that their properties are quite uniform. This makes them especially valuable for the preparation of biaxially oriented films of 0.003 to 0.008 inch thickness which are useful as photographic film base. The polyesters can be cast, coated with any of the vinylidene chloride, acrylic ester, itaconic acid copolymers described in Alles & Saner U. S. Patent 2,627,088, February 3, 1953, then biaxially oriented as described in that patent. After stretching, the film can be coated with a water-permeable colloid layer and a colloid silver halide emulsion of the kinds and as described in U. S. Patent 2,627,088.

The polymethylene terephthalates made in accordance with this invention are useful for the preparation of filaments, fibers and textile materials, shaped plastic articles, etc., the same as the prior art polyesters, but being more uniform in quality are more suitable in such arts. They show a markedly lower tendency to vary in molecular weight which is advantageous.

Another advantage is that films and fibers formed from polymers made by the above procedures have better gauge uniformity or more uniform cross-section. The fibers, moreover, dye more uniformly. Since the intrinsic viscosity can be controlled within narrow limits production difficulties are minimized.

What is claimed is:

1. In a process for the preparation of a highly polymeric polyalkylene terephthalate from a glycol of the formula $HO(CH_2)_nOH$ where $n$ is 2 to 10 and a compound taken from the group consisting of terephthalic acid and ester-forming derivatives thereof, to form a polyalkylene terephthalate of molecular weight between 23,300 and 33,500, in the presence of an esterification catalyst, the step which comprises incorporating with said reactants prior to completion of the esterification reaction, monomeric ester taken from the group consisting of alkyl β-naphthoates and 2-carboalkoxy-3-hydroxy naphthalenes wherein the alkyl and alkoxy groups contain 1 to 4 carbon atoms, in such an amount that the unsubstituted naphthoyl radical of such monomeric esters constitutes 1.34% to 0.93% by weight, respectively, of the molecular weight of the polyalkylene terephthalate, exclusive of the weight of the naphthoyl radical.

2. In a process for the preparation of a highly polymeric polyalkylene terephthalate from 2 to 3 mols of a glycol of the formula $HO(CH_2)_nOH$ where $n$ is 2 to 10 and a mol of a compound taken from the group consisting of terephthalic acid and ester-forming derivatives thereof, to form a polyalkylene terephthalate of molecular weight between 23,300 and 33,500, in the presence of an ester interchange catalyst, the step which comprises incorporating with said reactants prior to completion of the polyester-forming reaction, monomeric ester taken from the group consisting of alkyl β-naphthoates and 2-carboalkoxy-3-hydroxy naphthalenes wherein the alkyl and alkoxy groups contain 1 to 4 carbon atoms in such an amount that the unsubstituted naphthoyl radical of such monomeric esters constitutes 1.34% to 0.93% by weight, respectively, of the molecular weight of the polyalkylene terephthalate, exclusive of the weight of the naphthoyl radical.

3. In a process for the preparation of a highly polymeric polyalkylene terephthalate from at least 2 mols of a glycol of the formula $HO(CH_2)_nOH$ where $n$ is 2 to 10 and a mol of dimethyl terephthalate, to form a polyalkylene terephthalate of molecular weight between 23,300 and 33,500, in the presence of an esterification catalyst, the step which comprises adding to the reactants prior to completion of the esterification reaction, methyl β-naphthoate, in such an amount that it constitutes 1.61% to 1.12% by weight, respectively, of the molecular weight of the polyalkylene terephthalate, exclusive of the weight of the naphthoyl radical.

4. In a process for the preparation of a highly polymeric polyalkylene terephthalate from at least 2 mols of a glycol of the formula $HO(CH_2)_nOH$ where $n$ is 2 to 10 and a mol of dimethyl terephthalate, to form a polyalkylene terephthalate of molecular weight between 23,300 and 33,500, in the presence of an esterification catalyst, the step which comprises adding to the reactants prior to completion of the esterification reaction, n-butyl β-naphthoate, in such an amount that it constitutes 1.98% to 1.37% by weight, respectively, of the molecular weight of the polyalkylene terephthalate, exclusive of the weight of the naphthoyl radical.

5. In a process for the preparation of a highly polymeric polyalkylene terephthalate from at least 2 mols of a glycol of the formula $HO(CH_2)_nOH$ where $n$ is 2 to 10 and a mole of dimethyl terephthalate, to form a polyalkylene terephthalate of molecular weight between 23,300 and 33,500, in the presence of an esterification catalyst, the step which comprises adding to the reactants prior to completion of the esterification reaction, 2-carbomethoxy-3-hydroxy naphthalene in such an amount that it constitutes 1.76% to 1.22% by weight, respectively, of the molecular weight of the polyalkylene terephthalate, exclusive of the weight of the naphthoyl radical.

6. In a process of making a polyethylene terephthalate from at least 2 moles of ethylene glycol and a mol of dimethyl terephthalate, to form a polyethylene terephthalate of molecular weight between 23,300 and 33,500, in the presence of an esterification catalyst, the step which comprises incorporating with said reactants prior to completion of the esterification reaction, an alkyl β-naphthoate wherein said alkyl group contains 1 to 4 carbon atoms in such an amount that the unsubstituted naphthoyl radical of such monomeric ester constitutes 1.34% to 0.93% by weight, respectively, of the molecular weight of the polyethylene terephthalate, exclusive of the weight of the naphthoyl radical.

7. In a process of making a polyethylene terephthalate from at least 2 mols of ethylene glycol and a mol of dimethyl terephthalate, to form a polyethylene terephthalate of molecular weight between 23,300 and 33,500, in the presence of litharge, the step which comprises incorporating with said reactants prior to completion of the esterification reaction, methyl β-naphthoate in such an amount that it constitutes 1.61% to 1.12% by weight, respectively, of the molecular weight of the polyethylene terephthalate, exclusive of the weight of the naphthoyl radical.

References Cited in the file of this patent

FOREIGN PATENTS 610,138    Great Britain ---------- Oct. 12, 1948